United States Patent
Harrington et al.

(10) Patent No.: US 11,111,005 B2
(45) Date of Patent: Sep. 7, 2021

(54) CONTROL OF MULTIPLE FLIGHT CONTROL SURFACE SYSTEMS USING SINGLE POWER DRIVE UNIT

(71) Applicant: Hamilton Sundstrand Corporation, Charlotte, NC (US)

(72) Inventors: Erik Harrington, Machesney Park, IL (US); Timothy Michael Mayer, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 479 days.

(21) Appl. No.: 15/821,058

(22) Filed: Nov. 22, 2017

(65) Prior Publication Data
US 2019/0152583 A1  May 23, 2019

(51) Int. Cl.
| | | |
|---|---|---|
| *B64C 13/34* | (2006.01) | |
| *B64C 9/02* | (2006.01) | |
| *B64C 9/24* | (2006.01) | |
| *B64C 9/18* | (2006.01) | |
| *F16D 67/02* | (2006.01) | |

(52) U.S. Cl.
CPC ............... *B64C 13/34* (2013.01); *B64C 9/02* (2013.01); *B64C 9/18* (2013.01); *B64C 9/24* (2013.01); *F16D 67/02* (2013.01)

(58) Field of Classification Search
CPC .. B64C 13/34; B64C 9/06; B64C 9/12; B64C 13/28; B64C 9/02; B64C 13/24; B64C 9/18; B64C 9/24
See application file for complete search history.

(56) References Cited

U.S. PATENT DOCUMENTS

| | | | | |
|---|---|---|---|---|
| 4,779,822 A | * | 10/1988 | Burandt | ............... B64C 13/341 244/99.9 |
| 6,824,099 B1 | * | 11/2004 | Jones | ..................... B64C 13/28 244/99.12 |
| 8,074,937 B2 | | 12/2011 | Carl et al. | |
| 8,080,966 B2 | | 12/2011 | Potter et al. | |
| 9,682,769 B2 | * | 6/2017 | Richter | .................. B64C 13/30 |
| 9,701,421 B2 | * | 7/2017 | Neb | ......................... B64C 9/00 |
| 2009/0146015 A1 | * | 6/2009 | Schievelbusch | ... B64D 45/0005 244/213 |

(Continued)

FOREIGN PATENT DOCUMENTS

| | | | |
|---|---|---|---|
| CN | 106741863 A | * | 5/2017 |
| CN | 106741863 A | | 5/2017 |

(Continued)

OTHER PUBLICATIONS

European Search Report from the European Patent Office for European Application No. 18207069.8; Date of Completion: Apr. 11, 2019; 8 pages.

*Primary Examiner* — Magdalena Topolski
(74) *Attorney, Agent, or Firm* — Cantor Colburn LLP

(57) ABSTRACT

A secondary flight control system comprising: a first flight control surface system; a second flight control surface system; and a power distribution unit operably connected to the first flight control surface system and the second flight control surface system, wherein the power distribution unit is configured to generate torque to actuate the first flight control surface system and the second flight control surface system.

9 Claims, 4 Drawing Sheets

(56) References Cited

U.S. PATENT DOCUMENTS

| | | | |
|---|---|---|---|
| 2014/0042269 A1* | 2/2014 | Zantz | B64C 13/34 244/99.3 |
| 2017/0233095 A1* | 8/2017 | Baines | B64C 9/02 244/99.3 |
| 2019/0061531 A1* | 2/2019 | Harrington | H02P 3/025 |
| 2019/0168863 A1* | 6/2019 | Doring | B64C 9/16 |

FOREIGN PATENT DOCUMENTS

| | | | | |
|---|---|---|---|---|
| DE | 102017111553 A1 | 1/2018 | | |
| EP | 2039605 A2 | 3/2009 | | |
| EP | 2251258 A2 | 11/2010 | | |
| GB | 2573023 A * | 10/2019 | | B64C 9/20 |
| WO | 2008112363 A3 | 9/2008 | | |

* cited by examiner

400 ↘

404
Installing a first flight control surface system onto a wing of an aircraft

406
Installing a second flight control surface system onto the wing of an aircraft 408
Operably connecting a power distribution unit to the first flight control surface system and the second flight control surface system

504
Generating torque using a power distribution unit

506
Splitting the torque generated from the power distribution unit into a first drive line towards a first flight control surface system and a second driveline towards a second flight control surface system 508
Actuating at least one of the first flight control surface system and the second flight control surface system using the torque generated form the power distribution unit

FIG. 5

CONTROL OF MULTIPLE FLIGHT CONTROL SURFACE SYSTEMS USING SINGLE POWER DRIVE UNIT

BACKGROUND

The subject matter disclosed herein generally relates to flight control surface actuation systems, and more specifically to an apparatus and a method for transferring torque in a flight control surface actuation system.

Flight control surface actuation is commonly accomplished by separate drive systems and control systems, which leads to added weight and complexity.

BRIEF SUMMARY

According to one embodiment, a secondary flight control system is provided. The secondary flight control system comprising: a first flight control surface system; a second flight control surface system; and a power distribution unit operably connected to the first flight control surface system and the second flight control surface system, wherein the power distribution unit is configured to generate torque to actuate the first flight control surface system and the second flight control surface system.

In addition to one or more of the features described above, or as an alternative, further embodiments may include a T-gearbox operably connected to the power distribution unit, the first flight control surface system, and the second flight control surface system, wherein the T-gearbox is configured to split the torque from the power distribution unit into a first drive line towards the first flight control surface system and a second drive line towards the second flight control surface system.

In addition to one or more of the features described above, or as an alternative, further embodiments may include a first clutch operably connecting the first flight control surface system and the T-gearbox, wherein the first clutch is configured to engage and disengage the first flight control surface system from the T-gearbox.

In addition to one or more of the features described above, or as an alternative, further embodiments may include a second clutch operably connecting the second flight control surface system and the T-gearbox, wherein the second clutch is configured to engage and disengage the second flight control surface system from the T-gearbox.

In addition to one or more of the features described above, or as an alternative, further embodiments may include a first brake operably connected to the first flight control surface system along the first drive line, wherein the first brake is configured to stop transmission of torque along the first drive line.

In addition to one or more of the features described above, or as an alternative, further embodiments may include a second brake operably connected to the second flight control surface system along the second drive line, wherein the second brake is configured to stop transmission of torque along the second drive line.

In addition to one or more of the features described above, or as an alternative, further embodiments may include a control system in electronic communication with the power distribution unit, wherein the control system is configured to actuate the power distribution unit and monitor the first flight control surface system and the second flight control surface system.

In addition to one or more of the features described above, or as an alternative, further embodiments may include that the first flight control surface system is a slat system including one or more slats.

In addition to one or more of the features described above, or as an alternative, further embodiments may include that the second flight control surface system is a flap system including one or more flaps.

In addition to one or more of the features described above, or as an alternative, further embodiments may include that the second flight control surface system is a flap system including one or more flaps.

According to another embodiment, a method of assembling a secondary flight control system is provided. The method comprising: installing a first flight control surface system onto a wing of an aircraft; installing a second flight control surface system onto the wing of an aircraft; and operably connecting a power distribution unit to the first flight control surface system and the second flight control surface system, wherein the power distribution unit is configured to generate torque to actuate the first flight control surface system and the second flight control surface system.

In addition to one or more of the features described above, or as an alternative, further embodiments may include that the operably connecting a power distribution unit to the first flight control surface system and the second flight control surface system further comprises: operably connecting a T-gearbox to the power distribution unit; operably connecting the T-gearbox to the first flight control surface system; and operably connecting the T-gearbox to the second flight control surface system, wherein the T-gearbox is configured to split the torque from the power distribution unit into a first drive line towards the first flight control surface system and a second drive line towards the second flight control surface system.

In addition to one or more of the features described above, or as an alternative, further embodiments may include that the operably connecting the T-gearbox to the first flight control surface system further comprises: operably connecting a first clutch to the first flight control surface system; and operably connecting the first clutch to the T-gearbox, wherein the first clutch is configured to engage and disengage the first flight control surface system from the T-gearbox.

In addition to one or more of the features described above, or as an alternative, further embodiments may include that the operably connecting the T-gearbox to the second flight control surface system further comprises: operably connecting a second clutch to the second flight control surface system; and operably connecting the second clutch to the T-gearbox, wherein the second clutch is configured to engage and disengage the second flight control surface system from the T-gearbox.

In addition to one or more of the features described above, or as an alternative, further embodiments may include operably connecting a first brake to the first flight control surface system along the first drive line, wherein the first brake is configured to stop transmission of torque along the first drive line.

In addition to one or more of the features described above, or as an alternative, further embodiments may include operably connecting a second brake to the second flight control surface system along the second drive line, wherein the second brake is configured to stop transmission of torque along the second drive line.

In addition to one or more of the features described above, or as an alternative, further embodiments may include electronically connecting a control system to the power distribution unit, wherein the control system is configured to actuate the power distribution unit and monitor the first flight control surface system and the second flight control surface system.

In addition to one or more of the features described above, or as an alternative, further embodiments may include that the first flight control surface system is a slat system including one or more slats.

In addition to one or more of the features described above, or as an alternative, further embodiments may include that the second flight control surface system is a flap system including one or more flaps.

According to another embodiment, a method of actuating one or more flight control surface systems for an aircraft is provided. The method comprising: generating torque using a power distribution unit; splitting the torque generated from the power distribution unit into a first drive line towards a first flight control surface system and a second drive line towards a second flight control surface system; and actuating at least one of the first flight control surface system and the second flight control surface system using the torque generated form the power distribution unit.

Technical effects of embodiments of the present disclosure include utilizing a common power distribution unit to actuate a slat system and a flap system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 4 is a flow process illustrating a method of assembling a secondary flight control system, according to an embodiment of the present disclosure; and FIG. 5 is a flow process illustrating a method of actuating one or more flight control surface systems for an aircraft, according to an embodiment of the present disclosure.

DETAILED DESCRIPTION

A detailed description of one or more embodiments of the disclosed apparatus and method are presented herein by way of exemplification and not limitation with reference to the Figures.

Figure 1:
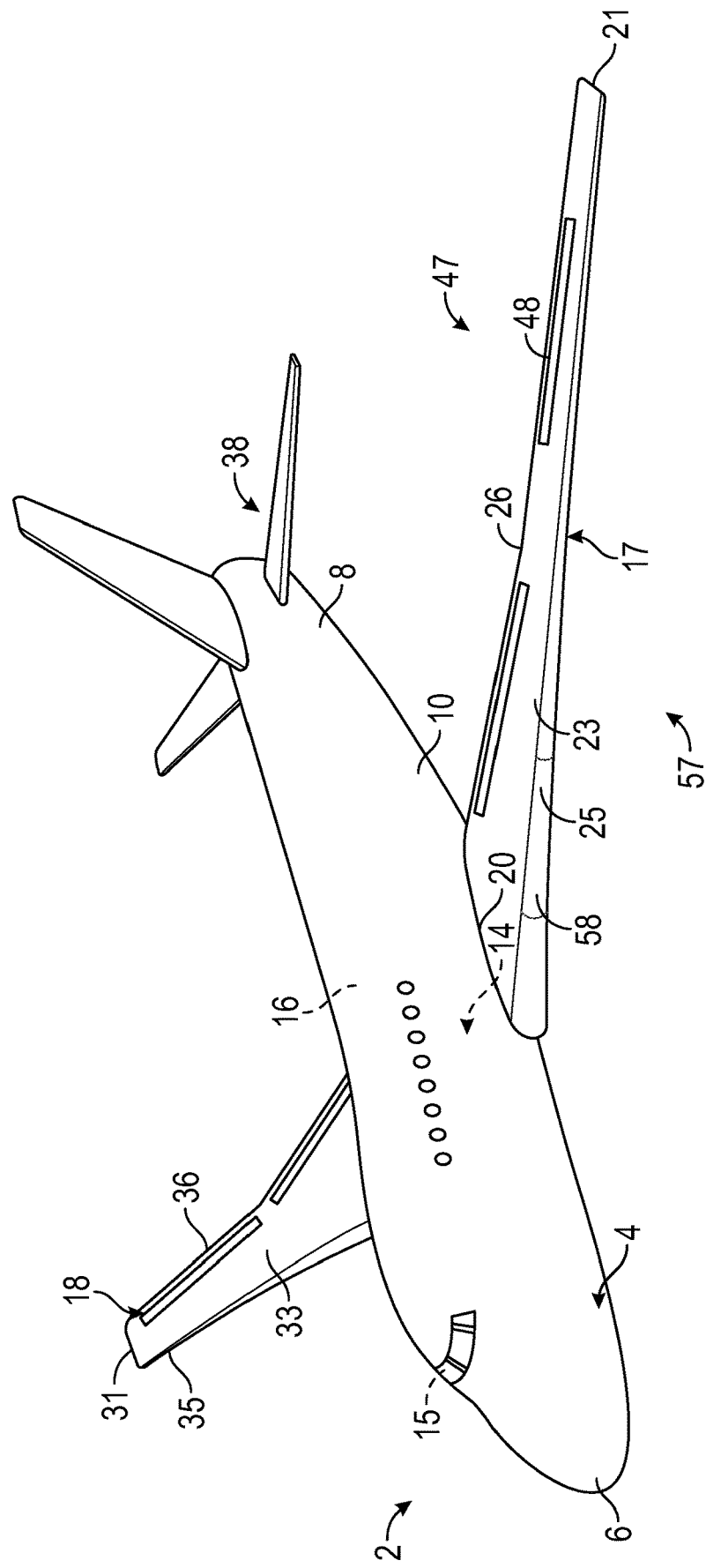
FIG. 1 is a perspective view of an aircraft, according to an embodiment of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. The aircraft 2 includes a first flight control surface system and a second flight control surface system configured to adjust the lift and drag characteristics of the first wing 17 and the second wing 18. The flight control surface systems may include but are not limited to flap systems, aileron systems, elevator systems, rudder systems, spoiler systems, slat systems, and any other known flight control surface system known to one of skill in the art. In the illustrated example of FIG. 1, the first flight control surface system is a flap system 47 and the second flight control surface system is a slat system 57. The flap system 47 includes one or more flaps 48 and the slat system 57 includes one or more slats 58. The flaps 48 may be located on the trailing edge 26 and the slats 58 may be located on the leading edge 25.

Figure 2:
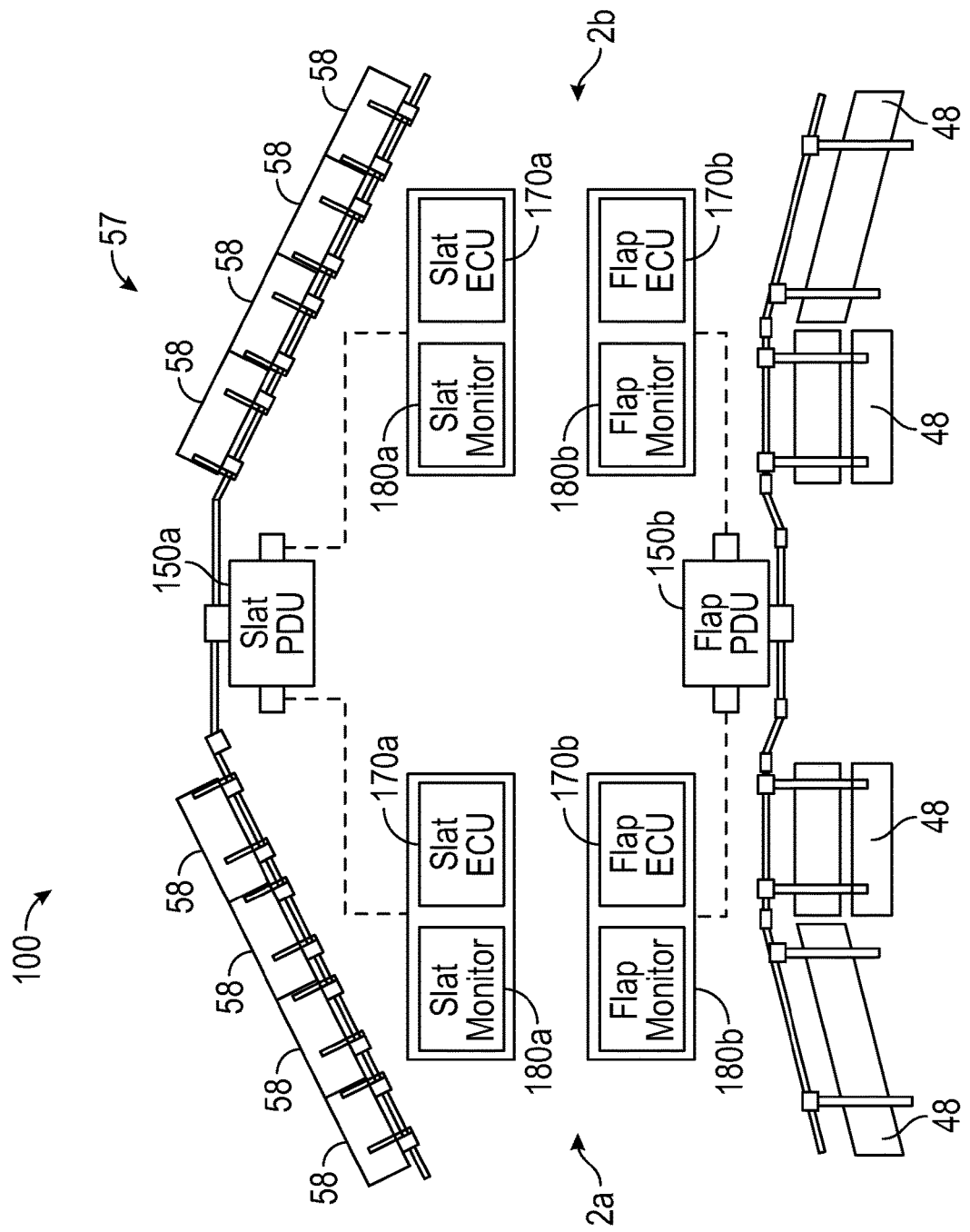
FIG. 2 is conventional secondary flight control system.

Referring now to FIG. 2 with continued reference to FIG. 1. FIG. 2 illustrates a schematic view of a conventional secondary flight control system 100. In aircraft having more than two flight control surface systems, the aircraft typically contains separate power distribution units (PDUs) for each flight control surface system. FIG. 2 shows a secondary flight control system 100 of an aircraft having a first flight control surface system and a second flight control surface system. It is understood that the secondary flight control system 100 may include one or more flight control surface systems. As mentioned above, the flight control surface systems may include but are not limited to flap systems, aileron systems, elevator systems, rudder systems, spoiler systems, slat systems, and any other known flight control surface system known to one of skill in the art. In the illustrated example of FIG. 2, the first flight control surface system is a flap system 47 and the second flight control surface system is a slat system 57. The flap system 47 includes one or more flaps 48 and the slat system 57 includes one or more slats 58.

The slat system 57 is operably connected to a slat power distribution unit (PDU) 150a. The slat PDU 150a is dedicated to the slat system 57 and is configured to transmit torque to each slat 58 of the slat system 57. The slat PDU 150a is also in electronic communication with a slat electronic control unit (ECU) 170a and a slat monitor 180a. There may be a slat ECU 170a and a slat monitor 180a for the port side 2a of the aircraft and the starboard side 2b of the aircraft 2. The slat ECU 170a is configured to control the slat PDU 150a and the slat monitor 180a is configured to monitor the performance of the slat system 57. The slat monitor 180a may be in communication with a plurality of sensors (not shown) operably connected to each slat 58 to monitor the performance of the slat system 57.

The flap system 58 is operably connected to a flap PDU 150b. The flap PDU 150b is dedicated to the flap system 47 and is configured to transmit torque to each flap 48 of the flap system 47. The flap PDU 150b is also in electronic communication with a flap electronic control unit (ECU) 170b and a flap monitor 180b. There may be a flap ECU 170b and a flap monitor 180b for the port side 2a of the aircraft and the starboard side 2b of the aircraft. The flap ECU 170a is configured to control the flap PDU 150b and the flap monitor 180b is configured to monitor the performance of the flap system 47. The flap monitor 180b may be in communication with a plurality of sensors (not shown) operably connected to each flap 48 to monitor the performance of the flap system 47.

Figure 3:
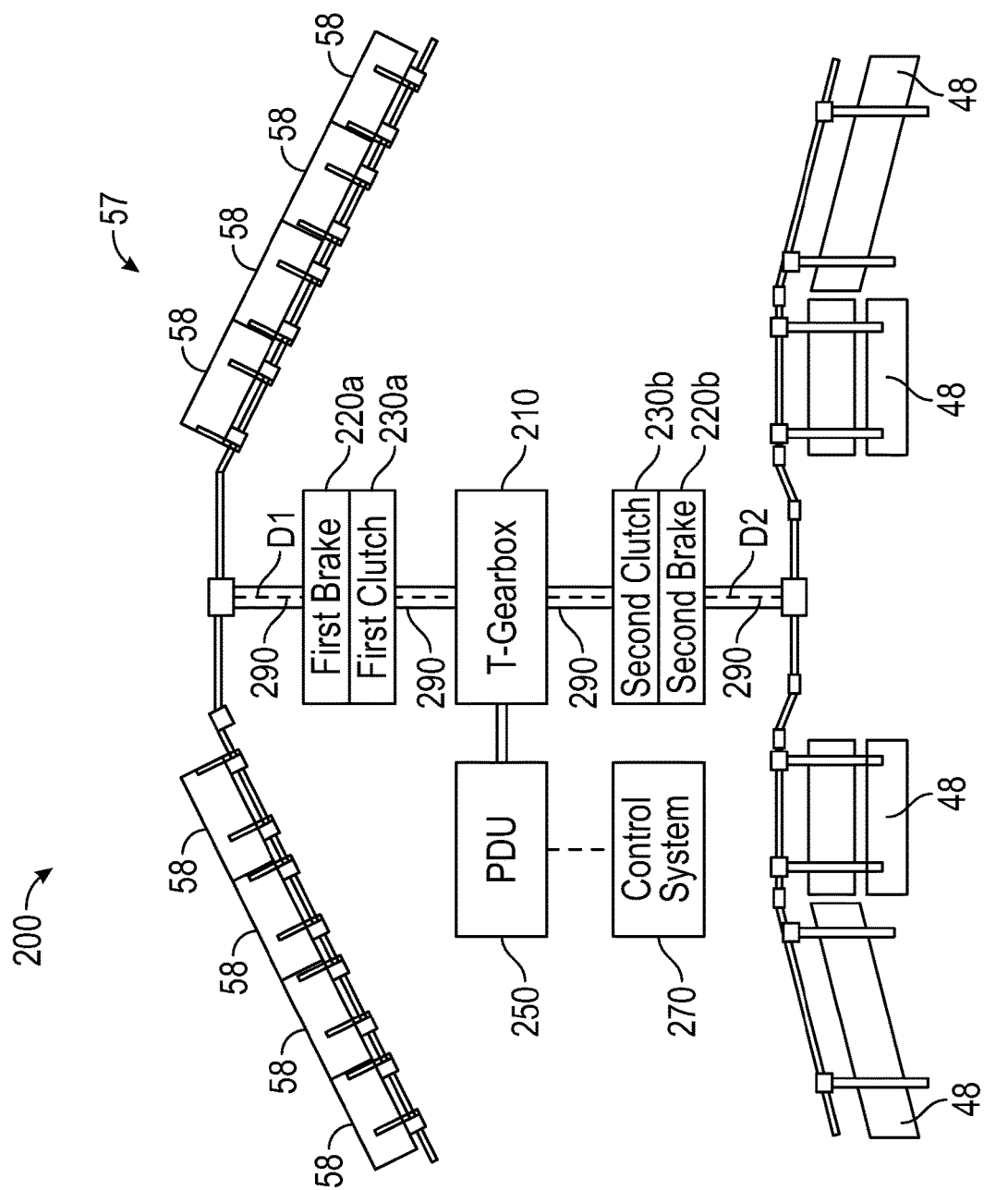
FIG. 3 is a secondary flight control system utilizing a single power drive unit to actuate two flight control surface systems, according to an embodiment of the present disclosure.

Referring now to FIG. 3 with continued reference to FIG. 1. FIG. 3 illustrates a schematic view of a secondary flight control system 200, in accordance with an embodiment of the present disclosure. FIG. 3 shows a secondary flight control system 200 of an aircraft having a first flight control surface system and a second flight control surface system. It is understood that the secondary flight control system 200 may include one or more flight control surface systems. As mentioned above, the flight control surface systems may include but are not limited to flap systems, aileron systems, elevator systems, rudder systems, spoiler systems, slat systems, and any other known flight control surface system known to one of skill in the art. In the illustrated example of FIG. 3, the first flight control surface system is a flap system 47 and the second flight control surface system is a slat system 57. The flap system 47 includes one or more flaps 48 and the slat system 57 includes one or more slats 58.

The slat system 57 and the flap system 47 are each operably connected to a PDU 250. The PDU 250 is configured to transmit torque to one or more flight control surface systems. In the example illustrated in FIG. 3, the PDU 250 is configured to transmit torque to the slat system 57 and the flap system 47. Torque may be output from the PDU 250 to a T-gearbox 210. The PDU 250 may be operably connected to the T-gearbox 210 through a torque tube 290. The T-gearbox 210 is configured to split the torque from the PDU 250 into two or more drive lines D1, D2. In the example illustrated in FIG. 3, the T-gearbox 210 splits the torque from the PDU 250 into a first drive line D1 towards the slat system 57 and a second drive line towards the flap system 47.

The T-gearbox 210 is operably connected to the slat system 57 through a first clutch 230a. A torque tube 290 may operably connect the first clutch 230a to the T-gearbox 210. A torque tube 290 may operably connect the slat system 57 to the first clutch 230a. The first clutch 230a may be configured to engage and disengage the slat system 57 from the T-gearbox 210. A first brake 220a may be operably connected to the slat system 57 along the first drive line D1 from the T-gearbox 210 to the slat system 57. In the illustrated example of FIG. 3, the first brake 220a may be operably connected to a torque tube 290 operably connecting the first clutch 230a to the slat system 57. The first brake 220a may be configured to stop the transmission of torque along the first drive line D1.

The T-gearbox 210 is operably connected to the flap system 47 through a second clutch 230b. A torque tube 290 may operably connect the second clutch 230b to the T-gearbox 210. A torque tube 290 may operably connect the flap system 47 to the second clutch 230b. The second clutch 230b may be configured to engage and disengage the flap system 47 from the T-gearbox 210. A second brake 220b may be operably connected to the flap system 47 along the second drive line D2 from the T-gearbox 210 to the flap system 47. In the illustrated example of FIG. 3, the second brake 220b may be operably connected to a torque tube 290 operably connecting the second clutch 230b to the flap system 47. The second brake 220b may be configured to stop the transmission of torque along the second drive line D2.

The PDU 250 is also in electronic communication with a control system 270. The control system 270 may include one or more slat/flap electronic control units (SFECU) for redundancy. The control system 270 may include a line-replacement unit (LRU) for redundancy. The control system 270 is configured to actuate the PDU 250. The control system 270 is also configured to monitor the performance of the slat system 57 and the flap system 47. The control system 270 may be in communication with a plurality of sensors (not shown) operably connected to each slat 58 to monitor the performance of the slat system 57. The control system 270 may be in communication with a plurality of sensors (not shown) operably connected to each flap 48 to monitor the performance of the flap system 47. Advantageously, since a single PDU 250 is utilized, about 50% of the power electronics may be eliminated.

The control system 270 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Advantageously, weight reduction may be achieved by utilizing a common PDU and common control system in the secondary flight control system 200 illustrated in FIG. 3, as opposed to the conventional secondary flight control system 100 shown in FIG. 2 that utilizes dedicated PDUs, monitors, and ECUs for each flight control surface system, which increases the weight.

Referring now to FIG. 4, with continued reference FIGS. 1-3. FIG. 4 shows a flow process illustrating a method 400 of assembling a secondary flight control system 200 according to an embodiment of the present disclosure. At block 404, a first flight control surface system is installed onto a wing 18, 17 of an aircraft 2. In an embodiment, the first flight control surface system is a slat system 57 including one or more slats 58. At block 406, a second flight control surface system is installed onto the wing 18, 17 of an aircraft 2. In an embodiment, the first flight control surface system is a flap system 47 including one or more flaps 48. At block 408, a PDU 250 is operably connected to the first flight control surface system and the second flight control surface system. The PDU 250 is configured to generate torque to actuate the first flight control surface system and the second flight control surface system.

The PDU 250 may be operably connected to the first flight control surface system and the second flight control surface system by: operably connecting a T-gearbox 210 to the PDU 250; operably connecting the T-gearbox 210 to the first flight control surface system; and operably connecting the T-gearbox 210 to the second flight control surface system. The T-gearbox 210 is configured to split the torque from the PDU 250 into a first drive line D1 towards the first flight control surface system and a second drive line D2 towards the second flight control surface system. The T-gearbox 210 may be operably connected to the first flight control surface system by: operably connecting a first clutch 230a to the first flight control surface system; and operably connecting the first clutch 230a to the T-gearbox 210. The first clutch 230a is configured to engage and disengage the first flight control surface system from the T-gearbox 210.

The T-gearbox 210 may be operably connected to the second flight control surface system by: operably connecting a second clutch 230b to the second flight control surface system; and operably connecting the second clutch 230b to the T-gearbox 210. The second clutch 230b is configured to engage and disengage the second flight control surface system from the T-gearbox 210.

The method 400 may also comprise: operably connecting a first brake 220a to the first flight control surface system along the first drive line D1. The first brake 220a is configured to stop transmission of torque along the first drive line D1. The method 400 may further comprise: operably connecting a second brake 220b to the second flight control surface system along the second drive line D2. The second brake 220b is configured to stop transmission of torque along the second drive line D2. The method 400 may also comprise: electronically connecting a control system 270 to the PDU 250. The control system 270 is configured to actuate the PDU 250 and monitor the first flight control surface system and the second flight control surface system.

While the above description has described the flow process of FIG. 4 in a particular order, it should be appreciated that unless otherwise specifically required in the attached claims the ordering of the steps may be varied.

Referring now to FIG. 5, with continued reference FIGS. 1-3. FIG. 5 shows a flow process illustrating a method 500 actuating one or more flight control surface systems for an aircraft 2, according to an embodiment of the present disclosure. At block 504, torque is generated using a PDU 250. At block 506, the torque generated from the PDU 250 is split into a first drive line D1 towards a first flight control surface system and a second drive line D2 towards a second flight control surface system. In an embodiment, the first flight control surface system is a slat system 57 including one or more slats 58. In an embodiment, the second flight control surface system is a flap system 47 including one or more flaps 48. The toque may be split using a T-gearbox 210, as described above. At block 508, at least one of the first flight control surface system and the second flight control surface system is actuated using the torque generated form the PDU 250.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A secondary flight control system, comprising:
    a first flight control surface system, wherein the first flight control surface system is a slat system including one or more slats;
    a second flight control surface system, wherein the second flight control surface system is a flap system including one or more flaps;
    a power distribution unit operably connected to the first flight control surface system and the second flight control surface system, wherein the power distribution unit is configured to generate torque to actuate the first flight control surface system and the second flight control surface system;
    a T-gearbox operably connected to the power distribution unit, the slate system, and the flap system, wherein the T-gearbox is configured to split the torque from the power distribution unit into a first drive line towards the slat system and a second drive line towards the flap system;
    a first clutch operably connecting the first flight control surface system and the T-gearbox in the first drive line, wherein the first clutch is configured to engage and disengage the first flight control surface system from the T-gearbox; and
    a second clutch operably connecting the second flight control surface system and the T-gearbox in the second drive line that is separate from the first drive line, wherein the second clutch is configured to engage and disengage the second flight control surface system from the T-gearbox,
    wherein the second clutch operates independently of the first clutch.

2. The secondary flight control system of claim 1, further comprising:
    a first brake operably connected to the first flight control surface system along the first drive line, wherein the first brake is configured to stop transmission of torque along the first drive line.

3. The secondary flight control system of claim 1, further comprising:
    a second brake operably connected to the second flight control surface system along the second drive line, wherein the second brake is configured to stop transmission of torque along the second drive line.

4. The secondary flight control system of claim 1, further comprising:
    a control system in electronic communication with the power distribution unit, wherein the control system is configured to actuate the power distribution unit and monitor the first flight control surface system and the second flight control surface system.

5. A method of assembling a secondary flight control system comprising:
    installing a first flight control surface system onto a wing of an aircraft;
    installing a second flight control surface system onto the wing of an aircraft; and
    operably connecting a power distribution unit to the first flight control surface system and the second flight control surface system, wherein the power distribution unit is configured to generate torque to actuate the first flight control surface system and the second flight control surface system, wherein the first flight control surface system is a slat system including one or more slats, wherein the second flight control surface system is a flap system including one or more flaps, wherein the operably connecting a power distribution unit to the first flight control surface system and the second flight control surface system further comprises:

operably connecting a T-gearbox to the power distribution unit;

operably connecting the T-gearbox to the slat system; and operably connecting the T-gearbox to the flap system,
wherein the T-gearbox is configured to split the torque from the power distribution unit into a first drive line towards the slat system and a second drive line towards the flap system, wherein the operably connecting the T-gearbox to the first flight control surface system further comprises, operably connecting a first clutch to the first flight control surface system;

operably connecting the first clutch to the T-gearbox, wherein the first clutch is configured to engage and disengage the first flight control surface system from the T-gearbox and wherein the first clutch is located in the first drive line;

operably connecting a second clutch to the second flight control surface system, and operably connecting the second clutch to the T-gearbox, wherein the second clutch is configured to engage and disengage the second flight control surface system from the T-gearbox, wherein the second clutch is located in the second drive line, wherein the second clutch operates independently of the first clutch.

6. The method of claim 5, further comprising:
operably connecting a first brake to the first flight control surface system along the first drive line, wherein the first brake is configured to stop transmission of torque along the first drive line.

7. The method of claim 5, further comprising:
operably connecting a second brake to the second flight control surface system along the second drive line, wherein the second brake is configured to stop transmission of torque along the second drive line.

8. The method of claim 5, further comprising:
electronically connecting a control system to the power distribution unit, wherein the control system is configured to actuate the power distribution unit and monitor the first flight control surface system and the second flight control surface system.

9. A method of actuating one or more flight control surface systems for an aircraft, the method comprising:
generating torque using a power distribution unit;
splitting, using a T-gearbox, the torque generated from the power distribution unit into a first drive line towards a first flight control surface system and a second drive line towards a second flight control surface system; and
actuating at least one of the first flight control surface system and the second flight control surface system using the torque generated form the power distribution unit,
wherein the first flight control surface system is a slat system including one or more slats,
wherein the second flight control surface system is a flap system including one or more flaps,
wherein the T-gearbox is configured to split the torque from the power distribution unit into the first drive line towards the slat system and the second drive line towards the flap system,
wherein the splitting further comprises:
engaging and disengaging the first flight control surface system and the T-gearbox in the first drive line with a first clutch; and
independent of the first clutch, engaging and disengaging the second flight control surface with a second clutch.

* * * * *